Sept. 16, 1952        P. T. D'AURORA        2,610,642
GLASS WASHING MACHINE

Filed May 27, 1946        3 Sheets—Sheet 1

INVENTOR.
BY Patsy T. D'Aurora
Florian G. Miller
Atty

Sept. 16, 1952 P. T. D'AURORA 2,610,642
GLASS WASHING MACHINE
Filed May 27, 1946 3 Sheets-Sheet 2
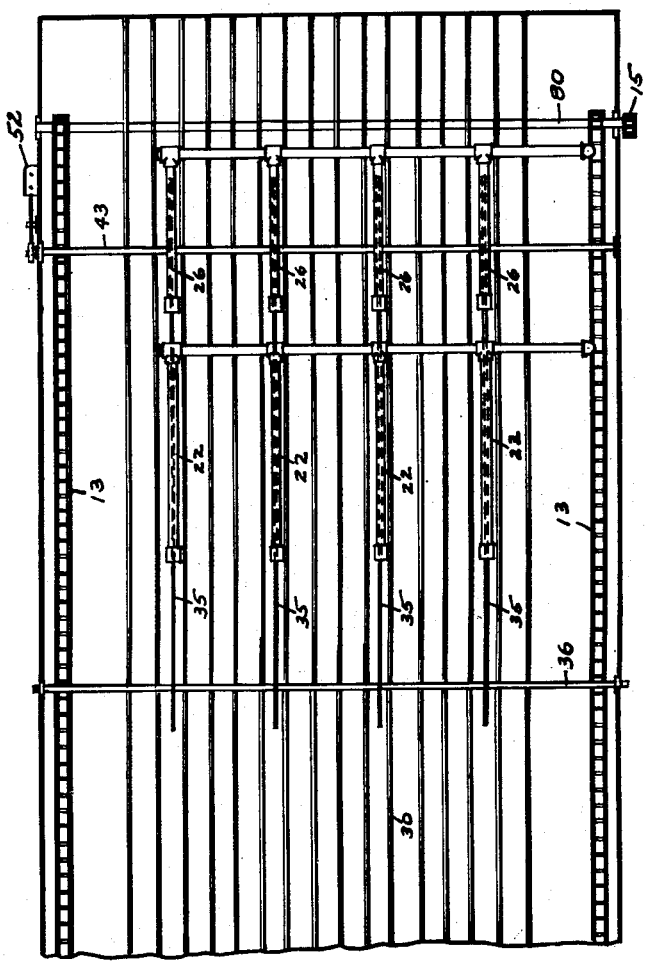
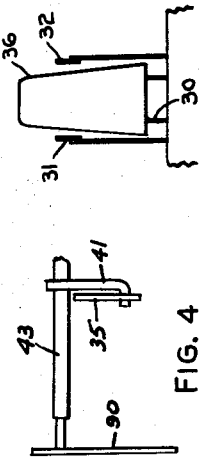
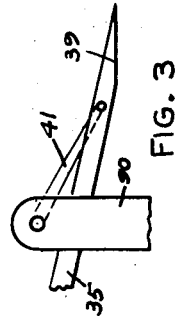
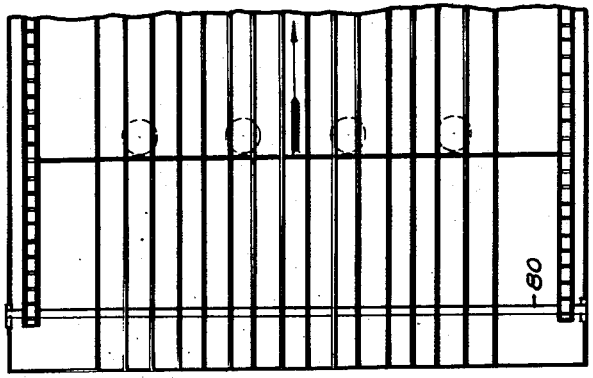
INVENTOR.
Potsy T. D'Aurora
BY Florian G. Miller
Atty.

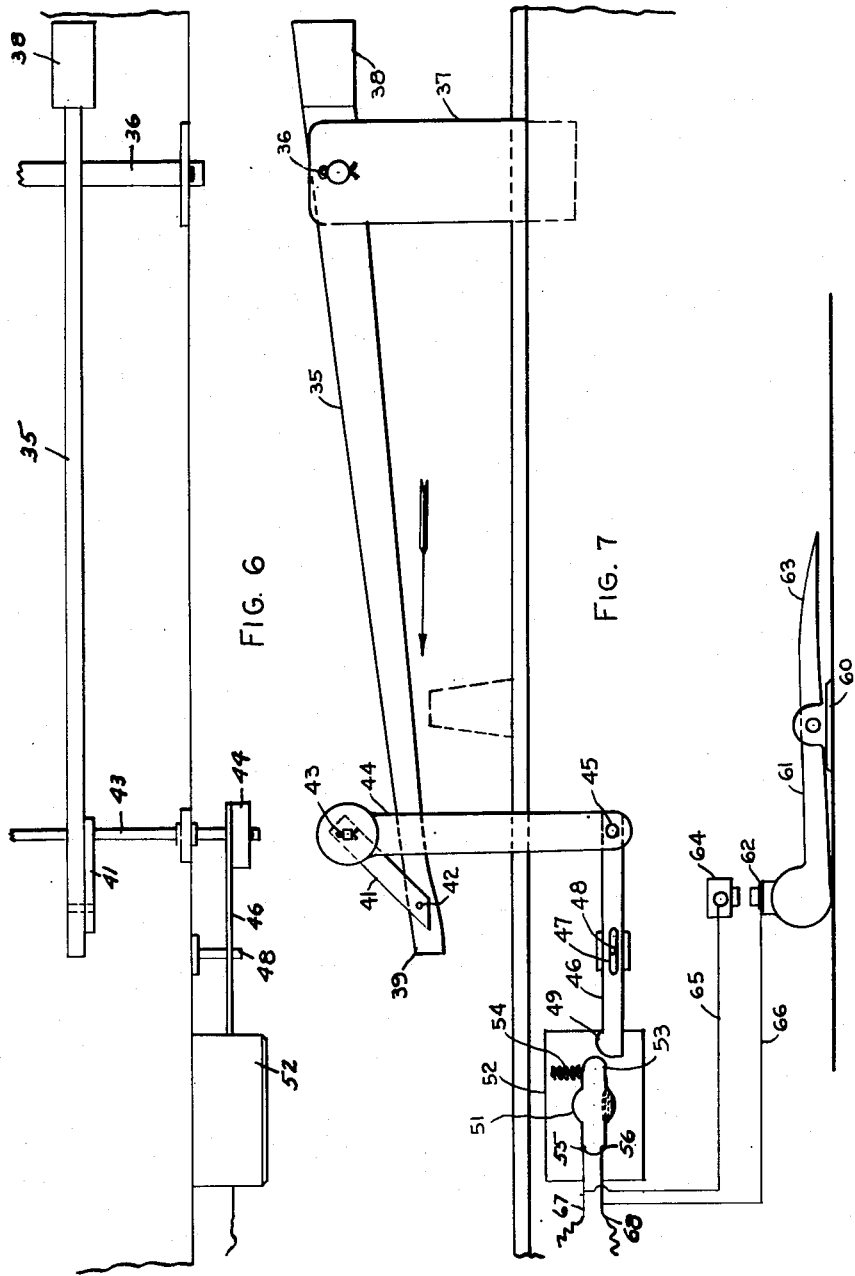

Patented Sept. 16, 1952

2,610,642

UNITED STATES PATENT OFFICE 2,610,642

GLASS WASHING MACHINE

Patsy T. D'Aurora, Erie, Pa.

Application May 27, 1946, Serial No. 672,557

6 Claims. (Cl. 134—47)

This invention relates generally to washing machines, and more particularly to automatic glass washing machines.

Machines have been provided for washing dishes, glasses, and the like, in which dishes placed in a dish rack would pass through and between spray nozzles and rinse nozzles. These machines have no automatic devices for shutting off the moving belts and chains when glasses are washed and passed from the machine. It has been always necessary in these prior machines to manually control the starting and stopping of the machine. No machine has been provided in which individual glasses pass through a machine and operate controls to stop the machine automatically. Laterally extending trips have been provided for engagement with heavy dish racks to provide wash fluid but no machine has been provided wherein the control of the entire machine is dependent upon sensitive engagement with an individual glass.

It is, accordingly, an object of my invention to provide a glass washing machine which overcomes the above and other defects in glass washing machines, and it is more particularly an object of my invention to provide a glass washing machine which is simple in construction, automatic in operation and shut-off, economical in cost, economical in manufacture, economical in space, and simple in construction.

Another object of my invention is to provide a glass washing machine which automatically shuts off the operation of the machine when the last glass passes through.

Another object of my invention is to provide a waste tank at the entrance of a glass washing machine.

Another object of my invention is to provide a glass washing machine which may be disposed underneath a bar, counter, or the like.

Another object of my invention is to provide a novel means for shutting off a glass washing machine.

Other objects of my invention will become evident from the following detailed description, taken in conjunction with the accompanying drawings, in which:

Fig. 2 is a plan view of my novel glass washing machine.

Fig. 3 is a fragmentary side elevational view showing the connection between the trip bars and the cross bar operating the shut-off switch.

Fig. 4 is a fragmentary end elevational view of the connection shown in Fig. 3.

Fig. 5 is a fragmentary view showing the glass guideways of my novel invention.

Fig. 6 is a fragmentary plan view showing one of my novel trip bars with a counterweight thereon, and its connection with a mercury switch, and Fig. 7 is a fragmentary side elevational view of the trip bar assembly shown in Fig. 6.

Figure 1:
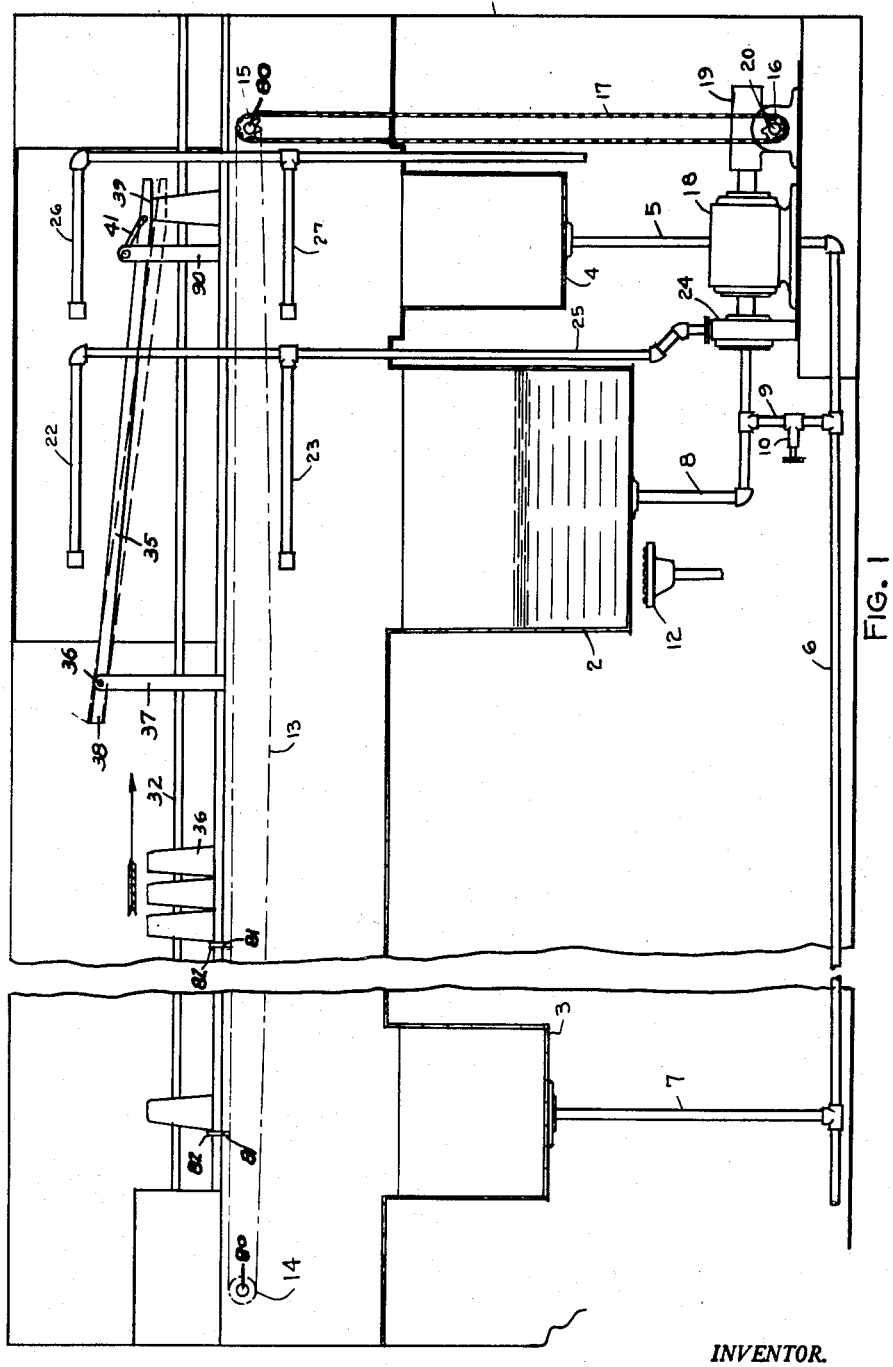
Fig. 1 is a diagrammatic side elevational view of my novel glass washing machine.

Referring now to the drawings, Figs. 1 and 2 show a frame 1 having wash tank 2, waste tank 3, and a rinse waste tank 4 disposed in the bottom thereof. Drain pipe 5 depends from rinse waste tank 4 and leads to a common drain pipe 6. Also connected to the common drain pipe 6 are the waste line 7 leading from the waste tank 3, and drain line 9, leading from pipe line 8 connected to the wash tank 2. Drain line 9 has a valve 10 for shutting off the drainage from wash tank 2. A thermostatically controlled gas heater 12 is provided for the wash tank 2. It will be evident that any form of heating means may be used without departing from the spirit of my invention.

In the upper part of the frame 1, an endless belt or chain 13, moves over sprockets 14, on shafts 80 on opposite ends thereof. The endless belts or chains 13, are operated by sprockets 15 and 16, engaged by chain 17, the sprocket 16 receiving driving force from an electric motor 18 and gears (not shown) in a reduction gear casing 19 rotating a shaft 20 upon which the sprocket 16 is fixedly mounted. Cross-bars 81 connect the endless chains 13 and have upwardly extending lugs 82 for pushing glasses 36 along guideways 34. Spray pipes 22 and 23 are disposed above and below the guideways, immediately above the wash tank 2 and receive washing fluid from the tank 2 through pipe 8, centrifugal pump 24 and pipe 25. Rinse pipes 26 and 27 are disposed above and below the guideways on the right end of the machine, immediately above the rinse tank 4, and receives clean rinsing water from any suitable source (not shown). The guideways 30 are preferably provided with side guides 31 and 32, shown in Figure 5, to prevent any breakage of the glasses 36 as they pass through the machine.

Now coming to the gist of my invention, I provide novel longitudinally extending trip bars 35, pivoted on cross-bar 36 which is journalled in brackets 37 secured to the sides of the frame 1. The trip bars 35 are made of an extremely light material and preferably have counterweights 38 as shown in Fig. 6 so that the engaging end 39 of the tripping bars 35 may be easily raised by a glass 36 passing along guideways 30. Brackets 41 are fixedly attached to the crossbar 43 journalled in brackets 90 and to the trip bars 35. The cross-bar 43, has depending therefrom on one side thereof a bracket 44 which moves up and down upon up and down movement of the end 39 of the tripping bars 35. The bracket 44 is pivotally attached at 45 to a lever 46, which has a slotted portion 47 engaging a pivot pin 48. It will be seen that the beaded end 49 of the lever moves up and down upon rotative movement of the bracket 44. A mercury switch 51 is disposed in a mercury switch casing 52 on the side of the frame 1, with one end thereof adapted to engage the beaded end 49 of the lever 46. When the beaded end 49 of the lever 46 is not in engagement with the end 53 of the mercury switch 51, spring member 54 moves the mercury switch to a horizontal position, as shown in Fig. 7, so that the mercury is out of contact with contact points 55 and 56. A foot lever 61 is pivoted on base 60 and has a contact 62 adapted to engage a contact 64, the contacts 62 and 64 having wires 65 and 66 connected thereto. The wires 65 and 66 are connected to wires 67 and 68 in circuit with motor 18. Closing of contacts 62 and 64 close the motor circuit to operate the motor 18, starting the machine in motion until such time as a glass 36 reaches the ends 39 of a trip bar 35 and lifts a trip bar 35 to rotate link 44, thereby tilting the mercury switch 51 to close the circuit to the motor through contacts 55 and 56 and wires 67 and 68.

In operation, a glass is placed on the left hand end of the machine, as shown in Fig. 1 in an inverted position, and waste from the glass passes into the waste tank 3. The foot lever 61 is depressed by the operator, thereby completing the circuit to the motor 18, and causing movement of the chains 13, and operation of the pump 24 to provide washing fluid to the washing nozzles 22 and 23. The glass 36 is pushed along the guideway 30 by a crossmember and lugs and when the glass 36 reaches a position on a guideway 30 where it engages a longitudinally extending trip bar 35 and the trip bar 35 is raised, the foot lever 61 is released and the trip bar 35 through the cross member 43, link 44 and lever 46, hold the mercury switch 51 in a tilted closed position as long as any glass is in engagement with any trip bar 35. When the glass passes beyond the trip bars 35 and out of engagement therewith, the trip bars 35 automatically fall to their lowest position, shown in Fig. 7, and the mercury switch 51 is pulled back to a horizontal position, as shown in Fig. 1, by the spring 54, thereby opening the circuit to the motor 18 and deenergizing the motor 18.

It will be evident that projecting members may be disposed on the end of the trip bars, so that glasses of different heights may be washed and they may be used to operate the trip bars by disposing a suitable form of projection upon the ends of the trip bars.

It will be evident from the foregoing that I have provided a novel glass washing machine which operates automatically without attention when glasses are being fed to the machine, and which automatically deenergizes the motor operating the machine when the last glass passes from the machine. It will further be evident that my machine is very economical in cost, it is very simple in construction and there are few moving parts on the machine to wear out.

Various changes may be made in the specific embodiment of my invention without departing from the spirit thereof, or from the scope of the appended claims.

What I claim is:

1. A glass washing machine comprising a wash tank, a rinse waste tank disposed adjacent said wash tank, wash nozzles disposed above said wash tank, a pump for wash fluid, a pipe line connecting said wash nozzles, said pump and said wash tank for supplying wash fluid to said wash nozzles, rinse nozzles disposed above said rinse tank, a source of water for said rinse nozzles, an endless belt for carrying glasses successively past said wash nozzles and said rinse nozzles, guideways for glasses extending longitudinally of said machine, means on said belt for moving said glasses lengthwise along said guideways, a plurality of smooth, elongated, innerconnected, parallel comparatively light tripping bars disposed above and in substantially vertical alignment with each of said guideways, a motor for operating said pump and said belt, a switch in circuit with said motor, and means connecting said tripping bars and said switch wherein said switch is closed to energize said motor when one or more of said tripping bars are engaged by a glass passing along said guideways, said rinse waste tank being adapted to receive wash water carried by said glasses and rinse water from said rinse nozzles.

2. A glass washing machine comprising a movable belt, guideways for guiding glasses therealong in longitudinal alignment, a comparatively light, elongated, slightly inclined, freely pivoted trip bar disposed above and in substantially vertical alignment with one of said guideways along which the glasses are moving, wash nozzles, said movable belt carrying glasses along said guideways past said wash nozzles for washing same, a pump for pumping wash fluid to said nozzles, a motor for operating said belt and said pump, and switch means in circuit with said motor adapted to be closed by said trip bar to energize said motor when said trip bar is engaged by a glass.

3. A glass washing machine as set forth in claim 2, wherein manual means are provided to energize said motor circuit other than said trip bar and switch means actuated thereby.

4. A glass washing machine comprising a wash and a rinse member, a longitudinally extending movable belt, a guideway above said belt for guiding glasses in alignment longitudinally therealong, said glasses being seated on said belt and being moved thereby successively past said wash member and said rinse member, respectively, for cleaning same, a pump for pumping wash fluid, a motor for operating said pump and for moving said belt, an elongated, pivoted, slightly inclined, comparatively light tripping bar disposed above said belt a predetermined distance and extending longitudinally of said belt for engagement by the upper sides of glasses on said belt, a switch in circuit with said motor, and means connected to said tripping bar for closing said switch when said tripping bar is moved upwardly by glasses moving on said belt.

5. A glass washing machine as set forth in claim 4 wherein said tripping bar is pivoted on the end of said machine from which the glasses are moving, and counterbalances are disposed on said tripping bar opposite to the glass engaging end thereof.

6. A glass washing machine comprising a wash tank, a rinse waste tank, wash nozzles disposed above said wash tank, a pump for wash fluid, a pipe line connecting said wash nozzles, said pump and said wash tank for supplying a source of wash fluid to said wash nozzles, rinse nozzles disposed above said rinse waste tank, a source of water for said rinse nozzles, an endless belt, guideways above said belt for guiding glasses disposed on said belt longitudinally of said machine, means on said belt for moving said glasses lengthwise successively past said wash nozzles and said rinse nozzles for cleaning same, a plurality of pivoted, comparatively light, parallel, elongated, innerconnected tripping bars disposed above and in substantially vertical alignment with each of said guideways, a motor for operating said pump and said belt, a switch in circuit with said motor, counterbalances for said pivoted bars, means connecting said tripping bars and said switch wherein said switch is closed to actuate said motor when one or more of said tripping bars are moved upwardly by a glass moving on said belt, said rinse waste tank being disposed beneath said endless belt adjacent said wash tank in the direction of movement of said endless belt to primarily receive wash water and rinse water from glasses.

PATSY T. D'AURORA.

REFERENCES CITED

The following references are of record in the file of this patent:

UNITED STATES PATENTS

| Number | Name | Date |
| --- | --- | --- |
| 771,093 | Keininger | Sept. 27, 1904 |
| 864,132 | Hood | Aug. 20, 1907 |
| 1,512,918 | Forsgard | Oct. 28, 1924 |
| 1,666,671 | Speer | Apr. 17, 1928 |
| 1,917,350 | Wolf | July 11, 1933 |
| 2,333,094 | De Back | Nov. 2, 1943 |

FOREIGN PATENTS

| Number | Country | Date |
| --- | --- | --- |
| 28,105 | France | Jan. 15, 1925 |
| (Addition to 579,475) | | |